UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLACK DISAZO DYE.

SPECIFICATION forming part of Letters Patent No. 644,239, dated February 27, 1900.

Application filed February 18, 1899. Serial No. 706,051. (Specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria and Empire of Germany, have invented new and useful Improvements in the Manufacture of Disazo Dyes from Chloramidophenol Sulfo-Acid, (for which patents have been obtained in Germany, No. B. 23,287, dated August 27, 1898; in England, No. 25,650, dated December 5, 1898, and in France, No. 271,265, dated November 25, 1898,) of which the following is a specification.

My invention relates to disazo coloring-matters which can be obtained from ortho-chlor-ortho-amido-phenol-para-sulfo-acid employing as middle component either alpha-naphthylamin or the alpha-naphthylamin-6- or 7-sulfo-acids, known as "Cleve's," either mixed with one another or not, and as end components the alpha-naphthol-4-sulfo-acid, beta-naphthol-3.6-disulfo-acid, (R-salt,) the alpha-naphthol-5-sulfo-acid, and when the Cleve's sulfo-acids of alpha-naphthylamin are used as middle component alpha-naphthylamin or R-salt can be well used as end components; but although I mention these instances of end components as being well suited for use in the invention my invention is not limited to their use; but other azo-dye components which are in practical use as end components in the manufacture of azo dyes can also, if desired, be used in accordance with this invention.

In the present application for Letters Patent I desire to claim generically the new coloring-matters, being the disazo dyes of ortho-chlor-ortho-amido-phenol-para-sulfo-acid, and specifically I claim that coloring-matter of this new class which contains alpha-naphthylamin as middle component and beta-naphthol 3.6-disulfo-acid (R-salt) as end component.

The ortho-chlor-ortho-amido-phenol-para-sulfo-acid which I use as my initial material can be prepared from the corresponding nitro-amido-sulfo-acid. For this purpose the said nitro-amido-acid is diazotized and the diazo compound treated, according to Gattermann's process, with finely-divided copper, which can be prepared according to the method described on page 1219 of Volume 23 of the *Berichte der Deutschen Chemischen Gesellschaft*, and hereinafter called "molecular copper," in hydrochloric-acid solution, and the resulting nitro-chlor-phenol-sulfo-acid is reduced. For the sake of convenience I give the following directions for the production of this ortho-chlor-ortho-amido-phenol-para-sulfo-acid: Dissolve about two hundred and thirty-four parts of the ortho-nitro-ortho-amido-phenol-para-sulfo-acid in one thousand parts of water, to which two hundred and thirty parts of caustic-soda lye (containing about thirty-five per cent. Na.O.H.) have been added. To this solution add a concentrated aqueous solution of seventy parts of sodium nitrite. Allow the whole mixture to run into a mixture of four hundred parts of hydrochloric acid (containing about thirty per cent. real H.Cl) diluted with five hundred parts of water. Add to the diazo solution thus obtained six hundred parts of hydrochloric acid (containing about thirty per cent. real H.Cl) and fifty parts of copper in the finely-divided state known as "molecular copper." The copper is preferably added in the form of a fifty-per cent. paste. Keep the mixture cool with ice during this addition, so that the temperature at no time rises above 15 centigrade. When no diazo compound is present in the solution, filter and precipitate the chlor-nitro-phenol-sulfo-acid resulting by the addition of about four hundred parts of potassium chlorid. Reduce in any ordinary way—for instance, with iron filings and acetic acid. Render the product alkaline with carbonate of soda, filter from the iron mud, concentrate the filtrate, if necessary, and precipitate the chlor-amido-phenol-sulfo-acid with hydrochloric acid. Purify, if necessary, by redissolving and recrystallizing.

The following example will serve to illustrate the manner in which my invention is best carried into practical effect and a disazo dye of the new class obtained:

*Example: Production of the new intermediate coloring-matter from ortho-chlor-ortho-amido-phenol-para-sulfo-acid and alpha-naphthylamin.*—Stir to a paste one hundred and twelve parts of the chlor-amido-phenol-sulfo-acid and five hundred parts of water. Add about sixty parts of caustic-soda lye, (containing about thirty-five per cent. Na.O.H.,) so as to dissolve the acid. To the solution add five hundred parts of ice-water and one hundred and fifty-five parts of hydrochloric acid, (containing about thirty per cent. real H.Cl.) Stir and add a concentrated solution of thirty-five parts of sodium nitrite in order to diazotize. Run the diazo solution into a solution of about eighty parts of alpha-naphthylamin in ninety-five parts of hydrochloric acid (containing about thirty per cent. real H.Cl) diluted with two thousand five hundred parts of water. Heat the mixture for about thirty-six hours to a temperature of from 60 to 70 centigrade. When no further diazo compound can be ascertained by tests to be present in the liquid, allow the mixture to cool. Filter, press, and dry, or preferably preserve this intermediate coloring-matter in the form of paste for further use. The coloring-matter so obtained is a dark-green powder, which is but slightly soluble in water, but soluble in alkalies with a red color. In a similar manner intermediate coloring-matter from Cleve's acid can be obtained. This coloring-matter is more soluble, owing to the presence of an extra sulfo group; but in other respects it closely resembles the intermediate coloring-matter from naphthylamin.

*Production of the new disazo coloring-matter from the intermediate coloring-matter from ortho-chlor-ortho-amido-phenol-para-sulfo-acid and alpha-naphthylamin, with R-salt as end component.*—Dissolve about thirty-eight parts of the coloring-matter obtained according to the first part of this example, taking this quantity of the actual coloring-matter, preferably in the form of the paste, undried, in one thousand parts of water, to which twenty-five parts of caustic-soda lye (containing thirty-five per cent. Na.OH) have been added. To the solution add seven parts of sodium nitrite in aqueous solution, and then while stirring run the mixed solution into about fifty-five parts of hydrochloric acid (containing about thirty per cent. real H.Cl) diluted with three hundred parts of ice-water. After stirring for about half an hour the production of the diazo compound is usually complete. It appears as a difficultly-soluble brown-red mass, somewhat soluble in alkalies, yielding a blue solution. Add the diazo compound to a soda alkaline solution of thirty-five parts of R-salt. The production of the coloring-matter is complete in a short time. Precipitate with common salt, press, and dry. In an analogous manner the disazo coloring-matters, using other middle components and other end components, can be obtained. If a base be used as an end component, such as alpha-naphthylamin or ethyl-beta-naphthylamin, it is advisable to combine in weakly acid solution, and subsequently convert the coloring-matter by treatment with carbonate of soda into its sodium salt.

My new coloring-matters are generally made in the form of a dark-colored powder, are black dyes, and are characterized by extraordinary coloring power, and, further, possess great fastness against the action of light. On treating the shades obtained with them with chromates they give shades which satisfy the most severe tests as to fastness, to milling, washing, and to light. They are more particularly characterized by their behavior on reduction either with ammonium sulfid in ammoniacal solution or with zinc-dust in a similar solution. On complete reduction chlor-amido-phenol-sulfo-acid occurs in the reduction products, and can be recognized, for instance, by diazotizing it and combining with R salt in alkaline solution. This test may conveniently be carried out as follows: The coloring-matter to be tested is dissolved in a little hot water and a large excess of ammonia is added. Boil the solution and add a small quantity of sulfid-of-ammonia solution and boil for a long time. The solution, which is originally deep blue, changes first to an intense red, and after heating for a long time is only slightly yellow-colored. Cool this solution, acidify with hydrochloric acid, and filter. The filtrate thus obtained contains the chlor-amido-phenol-sulfo-acid used in the manufacture of the dye. This can be recognized, for instance, by diazotizing with sodium nitrite and combining with R salt in alkaline solution. This combination takes place slowly on standing in the cold or more quickly on slightly warming. The coloring-matter obtained is blue-violet, which changes to intense red on treatment with hydrochloric acid.

The coloring-matter which I desire to claim specifically behaves exactly as described in the above test, and is further characterized by being readily soluble in water, giving a blue solution. The solution in sulfuric acid is blue-green.

Now what I claim is—

1. The disazo coloring-matters which can be obtained from ortho-chlor-ortho-amido-phenol-para-sulfo-acid and which yield chlor-amido-phenol-sulfo-acid on reduction, all substantially as described.

2. The disazo coloring-matter which may be obtained from ortho-chlor-ortho-amido-phenol-para-sulfo-acid, alpha-napthylamin as middle component, and beta-naphthol-3.6-disulfo-acid (R salt) as end component, which is readily soluble in water giving a blue solution, soluble in sulfuric acid giving a blue-green solution, and which yields ortho-chlor-ortho-amido-phenol-para-sulfo-acid upon reduction, all substantially as described.

In testimony whereof I have hereunto set my hand in the presence of two subscribing witnesses.

PAUL JULIUS.

Witnesses:
ERNEST F. EHRHARDT,
M. H. ISLER.